United States Patent Office 3,296,132
Patented Jan. 3, 1967

---

3,296,132
ALKYL ALKENETHIOPHOSPHONATE AND THEIR LUBRICANT COMPOSITION
James M. Petersen, Fishkill, and Joseph F. Lyons, Poughkeepsie, N.Y., assignors to Texaco Inc., New York, N.Y., a corporation of Delaware
No Drawing. Filed Oct. 18, 1962, Ser. No. 231,553
7 Claims. (Cl. 252—46.6)

This invention relates to novel reaction products of hydrocarbonthiophosphonic acids and trialkyl phosphites, their method of manufacture and lubricant compositions thereof.

More particularly, the invention pertains to alkyl hydrocarbonthiophosphonates of the formula:

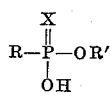

where R is a monovalent hydrocarbon derived radical (hydrocarbyl) and R' is alkyl and X is a chalcogen selected from the group consisting of sulfur and a mixture of oxygen and sulfur.

The alkyl hydrocarbonthiophosphonates of the invention are useful as detergent and dispersant additives in lubricant fuels, such as mineral oil, synthetic ester oil, and jet fuel.

Broadly, the alkyl hydrocarbonthiophosphonates are prepared by reacting trialkyl phosphite with hydrocarbonthiophosphonic acid at an elevated temperature.

PREPARATION OF THE HYDROCARBONTHIOPHOSPHONIC ACID REACTANT

Preparation of hydrocarbonthiophosphonic acid is described in co-assigned, copending application, Serial No. 59,505 filed September 30, 1960, now U.S. 3,087,956. The hydrocarbonthiophosphonic acid is prepared by contacting a hydrocarbon with $P_2S_5$ at a temperature of between about 100 and 320° C. in a non-oxidizing atmosphere, for example, under a blanket of nitrogen. In the reaction mixture the $P_2S_5$ constitutes about 5 to 40 wt. percent thereof. The resultant $P_2S_5$-hydrocarbon complex is hydrolyzed at a temperature between about 100 and 260° C. by contacting with steam. The steam treatment converts the hydrocarbon-$P_2S_5$ product to a hydrocarbonthiophosphonic acid and an inorganic phosphorus acid. The thiophosphonic acid has the general formula:

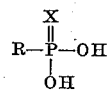

where R is hydrocarbyl (monovalent radical) derived from the charge hydrocarbon used in the manufacture of the hydrocarbon-$P_2S_5$ intermediate complex. R is preferably a mono-olefinic radical, derived from olefin polymer containing 20 to 200 carbons. X is sulfur or a mixture of sulfur and oxygen. X in the above formula is designated as sulfur or a mixture of sulfur and oxygen because the steam hydrolysis step usually results in the replacement with oxygen of a portion of the sulfur originally joined to the phosphorus.

Prior to the reaction of the thiophosphonic acid with the trialkyl phosphite, the inorganic acids are desirably removed by standard means such as those described in U.S. Patent Nos. 2,951,835 and 2,987,512 wherein the removal of the inorganic phosphorus acid is effected by contacting with synthetic hydrous alkaline earth metal silicates and synthetic hydrous alkali metal silicates respectively.

Broadly, suitable hydrocarbons for reaction with the $P_2S_5$, from which R in the foregoing formulas is derived, are aromatic hydrocarbons, cycloaliphatic hydrocarbons and aliphatic hydrocarbons. Although a wide variety of hydrocarbons are usable, aliphatic olefins are generally employed as the hydrocarbon reactant. The olefinic hydrocarbons which react with $P_2S_5$ usually contain at least 12 carbon atoms, although a lower molecular weight olefin can be employed. Mono-olefin polymers such as polyisobutylene, polybutylene, polypropylene and copolymers of olefins such as propylene with isobutylene are particularly suitable materials for reaction with $P_2S_5$. In general, olefin polymers and copolymers having an average molecular weight between about 250 and 50,000 are employed to form the $P_2S_5$-hydrocarbon products with polymers and copolymers having an average molecular weight in the range of from about 600 to 5000 being preferred. A particularly preferred olefin polymer is mono-olefinic polybutene having an average molecular weight between 600 and 50,000. Copolymers of conjugated dienes and olefins such as the copolymer of butadiene and isobutylene having an average molecular weight in the above range also are desirable reactants with $P_2S_5$.

TRIALKYL PHOSPHITE REACTANT

The trialkyl phosphite reactants contemplated herein are of the formula:

$$(R'O)_3P$$

where R' is alkyl of from 1 to 10 carbons.

Specific examples of the trialkyl phosphites contemplated herein are trimethyl phosphite, triethyl phosphite, tributyl phosphite, triheptyl phosphite, tri-isooctyl phosphite and methylethylpropyl phosphite.

PREPARATION OF THE ALKYL HYDROCARBONTHIOPHOSPHONATE

The alkyl hydrocarbonthiophosphonate of the invention is prepared by contacting hydrocarbonthiophosphonic acid with trialkyl phosphite at a temperature between about 50 and 175° C. in a mole ratio of thiophosphonic acid to phosphite between about 1:1 and 1:5. The reaction is normally conducted for a period between about 4 and 8 hours. At the end of the reaction period the formed alkyl hydrocarbonthiophosphonate can be purified by standard means such as employing fractional distillation under reduced pressure and elevated temperature alternatively utilizing an inert gas such as nitrogen as a stripping agent. Further methods of purification which may be employed are clay contacting or utilizing an ion exchange resin.

Specific examples of the alkyl hydrocarbonthiophosphonates contemplated herein are ethyl polybutene(940 M.W.)thiophosphonate, butyl polypropylene(2500 M.W.) thiophosphonate, butyl polyisobutylene (1500 M.W.)thiophosphonate, methyl propylene-isobutylene-copolymer (2000 M.W.)thiophosphonate.

LUBRICANT COMPOSITIONS CONTAINING THE NOVEL ALKYL HYDROCARBONTHIOPHOSPHONATE

It has been found that the alkyl hydrocarbonthiophosphonates of the invention impart detergent-dispersant properties to lubricating oils.

Hydrocarbon mineral oils are usable in the thiophosphonate lubricant composition of the invention. They can be paraffin base, naphthene base or paraffin-naphthene base distillate or residual oils. Paraffin base distillate lubricating oil fractions are used in the formulation of premium grade oil such as are contemplated in the invention. The lubricating bases generally have been subjected to solvent refining to improve their lubricity and viscosity-temperature relationship as well as solvent dewaxing to remove waxy components to improve the pour of the oil. Broadly speaking, mineral lubricating oils having an SUS viscosity at 100° F. between 50 and 1000 may be used in the formulation of the improved lubricants of this invention, but usually the SUS viscosity range falls between 70 and 300 at 100° F.

The mineral lubricating oils containing the alkyl hydrocarbonthiophosphonates of the invention may also contain other additives to impart other desirable properties thereto. For example, the VI improver such as polymethacrylates are normally used therein as are corrosion inhibitors and other detergents.

A widely used VI improver is polymethacrylate of the general formula:

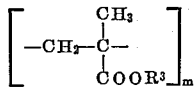

wherein $R^3$ is an aliphatic radical of from 1 to 20 carbons and $m$ is an integer of between 600 and 35,000.

Another used supplementary detergent is an alkaline earth metal alkylphenolate, barium nonylphenolate, barium dodecylcresolate and calcium dodecylphenolate are samples of such detergents. These products which are well known detergent additives are usually present in the lubricating oil in a concentration of between 0.1 and 5 wt. percent.

Still another additive employed is anti-oxidant divalent metal dialkyl dithiophosphates resulting from the neutralization of $P_2S_5$-alcohol reaction product with a divalent metal or divalent metal oxide. Barium and zinc dialkyl dithiophosphates are the most widely used oxidation and corrosion inhibitors. Metal dialkyl thiophosphates are usually present in the lubricant concentration between 0.1 and 3 wt. percent.

Synthetic lubricating bases of the ester or ether type may be used as lubricating base oils. High molecular weight, high boiling aliphatic dicarboxylic acid esters possess excellent viscosity-temperature relationships and lubricating properties and are finding ever-increasing utilization in lubricating oils adapted for high and low temperature lubrication. Esters of these types are used in the formulation of jet engine oils.

The alkyl hydrocarbonthiophosphonates of the invention are present in lubricating oils in concentrations sufficient to impart dispersant and detergent properties thereto. In concentrates used in the formulation of the finished lubricants the concentration of the alkyl hydrocarbonthiophosphonate can be as high as 50%. In finished lubricants the concentration of additives falls between 0.2 and 10 wt. percent with a concentration between 1 and 5 wt. percent normally preferred.

The following examples further illustrate the invention but are not to be construed as limitations thereof.

Example I

To a 2-liter, 3 necked flask fitted with a glass stirrer, condenser and thermocouple, there was added 700 grams of a naphthene oil (100 SUS at 100° F) containing 0.25 mole of polybutene(940 M.W.)thiophosphonic acid of the formula:

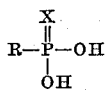

where R is a polybutene radical having an average molecular weight of 940 and X is a mixture of sulfur and oxygen. To the thiophosphonic acid there was added 42 grams (0.25 mole) triethyl phosphite and the stirred reaction mixture was heated for a total of 7 hours at 150° C. The reaction mixture was then stripped at 150° C. under reduced pressure for 2 hours utilizing a water aspirator.

Analysis determined the product to be an oil solution of ethyl polybutene(940 M.W.)thiophosphonate of the formula:

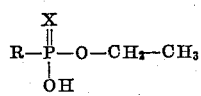

wherein R is a polybutene radical having an average molecular weight of 940 and X is a mixture of sulfur and oxygen.

Analysis of the thiophosphonic acid reactant and thiophosphonate product found the following:

| Description | Neut. No. | | P, wt. percent | | S, wt. percent | |
| --- | --- | --- | --- | --- | --- | --- |
| | Calc. | Found | Calc. | Found | Calc. | Found |
| Polybutene (940 M.W.) thiophosphonic acid | | 20 | 1.11 | 0.97 | *1.15 | 0.64 |
| Ethyl polybutene (940 M.W.) thiophosphonate | 0 | 4.8 | 1.10 | 0.9 | *1.13 | 0.60 |

*Based on X=100% sulfur.

Example II

To a 3-liter flask fitted with a glass stirrer, condenser and thermocouple, there was placed 1400 grams of a naphthene oil (100 SUS at 100° F.) solution containing 0.5 mole of polybutene(940 M.W.)thiophosphonic acid of the formula:

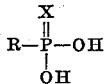

where R is a polybutene radical of an average molecular weight of 940 and X is a mixture of sulfur and oxygen. To the thiophosphonate reactant there was added 70 grams (0.56 mole) of trimethyl phosphite. The reaction mixture was heated to 100° C. for 6 hours with stirring and then stripped at 100° C. utilizing a water aspirator. The product was found to be an oil solution of methyl polybutene(940 M.W.)thiophosphonate of the formula where R and X are as heretofore defined:

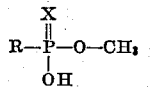

Analysis of the product showed the following:

| Description | Calculated | Found |
| --- | --- | --- |
| Neut. No | 0 | 6.6 |
| Percent Phosphorus | 1.10 | 1.17 |

Example III

This example illustrates the lubricant composition of the invention and the detergent-dispersant properties of the thiophophonates of the invention utilizing the well known CLR engine sludge test. A description of the SAE 10W–30 motor oil containing the thiophosphonates of the invention and a comparative SAE 10W-30 control sample are reported below. The CLR Engine Test results are also reported:

| Description | A | B | Control |
| --- | --- | --- | --- |
| Refined paraffinic distillate oil (SUS-100 at 100° F) | 90.72 | 88.0 | 93.73 |
| Methyl polybutene (940 M.W.) thiophosphonate (Ex. II) | 2 | | |
| Ethyl polybutene (940 M.W.) thiophosphonate (Ex. I) | | 4.70 | |
| Barium C₁₂ alkyl phenolate | 1.83 | 1.83 | 1.83 |
| Zinc isopropyl 1,3-dimethylbutyl dithiophosphate | 0.88 | 0.87 | 0.87 |
| CO₂ neutralized basic barium sulfonate | 0.57 | 0.57 | 0.57 |
| Mineral oil concentrate containing 25 wt. percent of a copolymer of mixed methacrylate alkyl esters in which the alkyl groups range from butyl to octadecyl | 4.00 | 4.00 | 4.00 |
| Dimethyl silicon anti-foam concentrate, p.p.m. | 150 | 150 | 150 |

CLR* LOW TEMPERATURE SLUDGE ENGINE TEST RESULTS

| Hours | Oil A | Oil B | Control |
| --- | --- | --- | --- |
| 38 | | 8 | 6.9 |
| 54 | 6.3 | 6.5 | 5.4 |
| 70 | 5.6 | 5.9 | |
| 94 | | 5.2 | |

*Clean oil rating=10.

It can be seen from the foregoing the control after 54 hours of operation had a poorer sludge rating than the thiophosphonate containing oils after 70 hours.

We claim:
1. A product selected from the group consisting of alkyl hydrocarbonthiophosphonate and a mixture of said alkyl hydrocarbonthiophosphonate and the corresponding alkyl hydrocarbonphosphonate, said alkyl hydrocarbonthiophosphonate being of the formula:

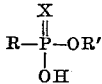

where R is hydrocarbyl derived from a polyolefin having an average molecular weight between about 250 and 50,000, R' is alkyl from 1 to 10 carbons and X is sulfur, said mixture consisting of a major amount of said hydrocarbonthiophosphonate and a minor amount of said corresponding hydrocarbonphosphonate where X is oxygen.

2. A product in accordance with claim 1 where R is a polybutene derived radical having an average molecular weight of 940, R' is methyl and said product is said mixture.

3. A product in accordance with claim 1 where R is a polybutene derived radical of an average molecular weight of 940, R' is ethyl and said product is said mixture.

4. A lubricant composition comprising a lubricating oil and between 0.2 and 10 weight percent of a product selected from the group consisting of an alkyl hydrocarbonthiophosphonate and a mixture of said alkyl hydrocarbonthiophosphonate and corresponding alkyl hydrocarbonphosphonate, said alkyl hydrocarbonthiophosphonate of the formula:

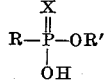

where R is hydrocarbyl derived from a polyolefin having an average molecular weight between about 250 and 50,000, R' is alkyl of from 1 to 10 carbons and said mixture consists of a major amount of said alkyl hydrocarbonthiophosphonate and a minor amount of alkyl hydrocarbonphosphonate where X is oxygen.

5. A lubricating composition in accordance with claim 4 wherein said lubricating oil is a mineral lubricating oil having an SUS viscosity at 100° F. of between 50 and 1000.

6. A lubricating composition in accordance with claim 5 wherein R is a polybutene radical of an average molecular weight of 940, R' is methyl, and said product is said mixture.

7. A lubricating composition in accordance with claim 5 wherein R is a polybutene radical of an average molecular weight of 940, R' is ethyl, and said product is said mixture.

References Cited by the Examiner

UNITED STATES PATENTS

| | | | |
| --- | --- | --- | --- |
| 2,688,612 | 9/1954 | Watson | 252—32.7 |
| 2,708,204 | 5/1955 | Bell et al. | 260—461 |
| 2,784,208 | 3/1957 | Ries | 260—461 |
| 2,900,376 | 8/1959 | Sabol et al. | 252—32.7 |
| 2,960,529 | 11/1960 | McCall et al. | 260—982 |
| 2,984,680 | 5/1961 | Walsh | 260—982 |
| 3,155,709 | 11/1964 | Newalles et al. | 260—961 |

OTHER REFERENCES

McIvor et al.: "Chemical Abstracts," vol. 52, col. 14330 (1958).

DANIEL E. WYMAN, *Primary Examiner.*

L. G. XIARHOS, *Assistant Examiner.*